(12) United States Patent
Sadovsky et al.

(10) Patent No.: US 7,933,874 B2
(45) Date of Patent: Apr. 26, 2011

(54) MAINTAINING TRACKING INFORMATION FOR ELECTRONIC DOCUMENTS

(75) Inventors: Vladimir Sadovsky, Bellevue, WA (US); Michael D. Stokes, Eagle, ID (US); Joseph D. Ternasky, Mountain View, CA (US); Hubert Van Hoof, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 11/559,650

(22) Filed: Nov. 14, 2006

(65) Prior Publication Data

US 2008/0114768 A1    May 15, 2008

(51) Int. Cl.
*G06F 7/00*     (2006.01)
*G06F 17/00*    (2006.01)

(52) U.S. Cl. ........................................ 707/648
(58) Field of Classification Search ............ 707/648, 707/999.01, 999.107
See application file for complete search history.

(56) References Cited

U.S. PATENT DOCUMENTS

| | | | |
|---|---|---|---|
| 5,414,528 A | 5/1995 | Hatamura | |
| 2002/0077985 A1* | 6/2002 | Kobata et al. | 705/51 |
| 2003/0020959 A1 | 1/2003 | Henry | |
| 2003/0169458 A1 | 9/2003 | Quach | |
| 2003/0200266 A1* | 10/2003 | Henry | 709/206 |
| 2003/0217008 A1* | 11/2003 | Habegger et al. | 705/51 |
| 2003/0217275 A1* | 11/2003 | Bentley et al. | 713/184 |
| 2004/0148503 A1 | 7/2004 | Sidman | |
| 2005/0004885 A1 | 1/2005 | Pandian et al. | |
| 2005/0039034 A1* | 2/2005 | Doyle et al. | 713/193 |
| 2005/0172033 A1 | 8/2005 | Mathew et al. | |
| 2006/0031351 A1 | 2/2006 | Marston et al. | |
| 2006/0242566 A1* | 10/2006 | Dunietz et al. | 715/517 |

FOREIGN PATENT DOCUMENTS

WO    WO0160050    8/2001

OTHER PUBLICATIONS

Leffler, "FlexFAX—A Network-based Facsimile Service" retrieved at <<http://www.chemie.fu-berlin.de/chemnet/doc/flexfax/flexfax.ps>>, Silicon Graphics, Inc., Mountain View, CA, Nov. 27, 1990, pp. 1-9.

"Microsoft Fax: The Basics Microsoft Windows 95: MS Fax" retrieved on Aug. 14, 2006 at <<http://www.microsoft.com/technet/archive/win95/rk27_fax.mspx?mfr=true>>, Microsoft Corporation, 2006, pp. 1-12.

* cited by examiner

*Primary Examiner* — Hosain T Alam
*Assistant Examiner* — Van H Oberly
(74) *Attorney, Agent, or Firm* — Lee & Hayes, PLLC

(57) ABSTRACT

A plurality of parts for an electronic document are generated. The plurality of parts include a root relationship part that identifies one or more of the plurality of parts, a payload part that stores data for the electronic document, and a tracking information part that stores tracking information for the electronic document. All of these parts are stored in a single package.

15 Claims, 6 Drawing Sheets

MAINTAINING TRACKING INFORMATION FOR ELECTRONIC DOCUMENTS

BACKGROUND

As computer technology has advanced and computers have become increasingly commonplace, a transition from paper-based documents to electronic documents is being made. More and more documents are being communicated in electronic form by using electronic delivery services, such as email, than in hard copy form by using more traditional mail or paper document delivery services. One problem faced when communicating electronic documents is how to keep a record of various tracking information for the electronic documents, such as who the documents were sent to and when the documents were sent. Email programs will sometimes maintain a record of when and where an email was sent, but this record is separate from the electronic document itself and the application that created the electronic document typically has no access to this record. Accordingly, it would be beneficial to have an improved manner in which to maintain tracking information for electronic documents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects of maintaining tracking information for electronic documents, a plurality of parts for an electronic document are generated. The plurality of parts include a root relationship part that identifies one or more of the plurality of parts, a payload part that stores data for the electronic document, and a tracking information part that stores tracking information for the electronic document. All of these parts are stored in a single package.

BRIEF DESCRIPTION OF THE DRAWINGS

The same numbers are used throughout the drawings to reference like features.

DETAILED DESCRIPTION

Maintaining tracking information for electronic documents is discussed herein. Electronic documents refer to any of a variety of different types of documents (e.g., including characters, symbols, equations, images, and so forth) that are stored electronically rather than in rendered form (e.g., rather than in paper or other hard copy form, film, bitmap image, or any other physically rendered form). Electronic documents are maintained in a package including multiple parts. The various parts are separate but related to one another. One part of the package is a tracking information part that maintains tracking information for the electronic document. The tracking information can identify, for example, the recipient(s) of the electronic document, date and/or time when the electronic document was sent, and so forth. Additionally, digital rights management techniques can be employed to protect the electronic document, and different rights can be assigned to different parts of the electronic document.

Figure 1:
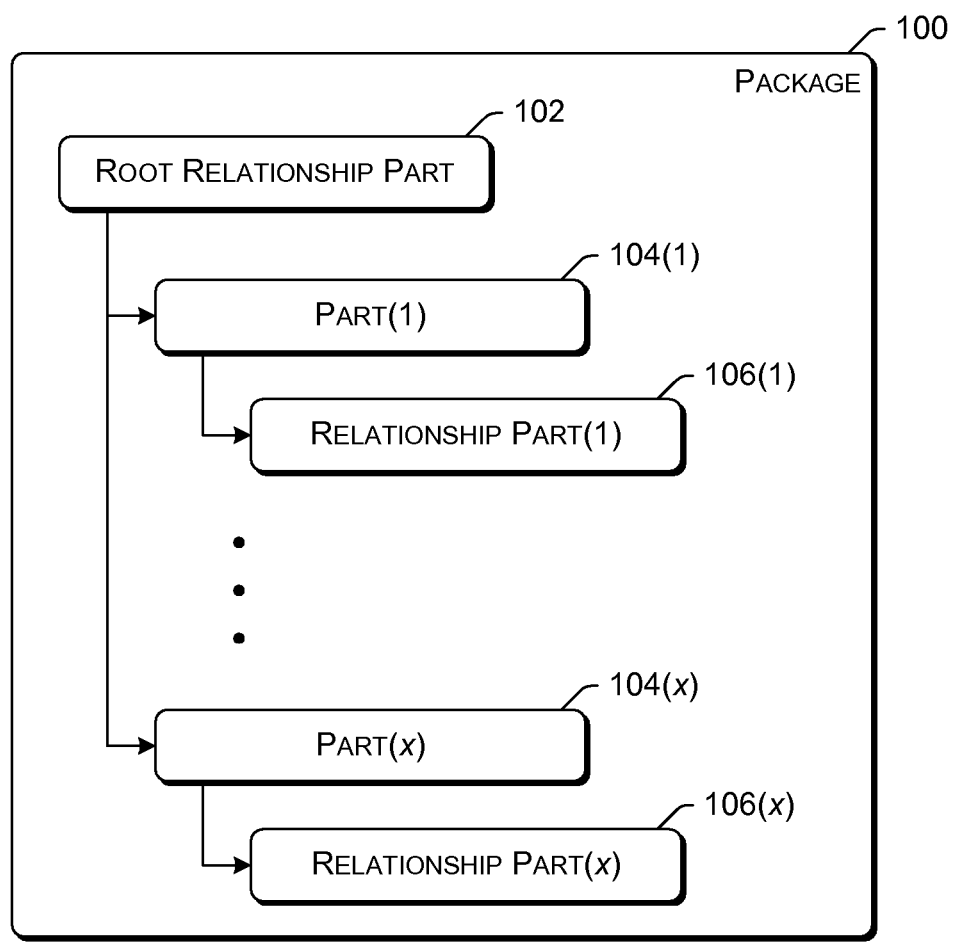
FIG. 1 illustrates an example package for an electronic document.

FIG. 1 illustrates an example package 100 for an electronic document. Package 100 includes a root relationship part 102, multiple (x) parts 104(1), . . . , 104(x), and multiple (x) relationship parts 106(1), . . . , 106(x). A package refers to the logical entity that holds a collection of one or more parts, and a container refers to a file that represents a package. Typically the container is a single file, although alternatively the container may be made up of multiple files.

Each part 104 and relationship part 106, as well as root relationship part 102, can be stored in different manners. In certain embodiments, each part is a separate file, but is accessed by applications and the operating system through the package 100 rather than individually. For example, if an application desires to display an electronic document, the application does not initially access individual parts 104. Rather, the application initially accesses root relationship part 102 (and optionally one or more relationship parts 106) to identify which one or more parts 104 have the data to create the display for the electronic document, and then accesses the identified parts 104.

Root relationship part 102 identifies all the parts 104 in package 100. Each part 104 is a collection of bytes of the electronic document. Any of a variety of different formats can be used for parts 104, including public and proprietary formats. For example, some parts may be in an eXtensible Markup Language (XML) format, some may be in a HyperText Markup Language (HTML) format, others may be in a proprietary format, and so forth.

Different types of parts 104 can be included. One type of part is typically a payload part, in which most, if not all, of the data of the electronic part is stored (e.g., the words, symbols, characters, etc. of a word processing document; the data, formulas, etc., in the entries of a spreadsheet; the records of a database; the pixel values for an image; and so forth). Other types of parts describe different aspects of the electronic document, such as digital rights management (DRM) techniques employed to protect the electronic document, tracking information for the electronic document, and so forth.

Each part 104 can have associated with it one or more relationship parts 106. Although each part 104 in FIG. 1 is illustrated as having one associated relationship part, alternatively some parts 104 may have no associated relationship parts, and some parts 104 may have two or more associated relationship parts. Each relationship part 106 identifies a part 104 in package 100 or a resource external to package 100. An external resource is a resource that is not part of package 100; the resource may be located on the same computing device as package 100, or alternatively a different computing device. For example, a relationship part 106 associated with a DRM part 104 may identify the parts 104 in package 100 to which the DRM techniques in the DRM part 104 are applied. By way of another example, a relationship part 106 associated with a payload part 104 may identify an image stored at a resource external to package 100 (e.g., a location on a particular server or other computing device) that is to be included as part of the data of the electronic document (e.g., displayed to the user when the electronic document is displayed). The part 104 or external resource identified by the relationship part 106 can be identified in the relationship part 106 in different manners, such as by including in the relationship part 106 a Uniform Resource Identifier (URI) of the part 104 or external resource.

Typically root relationship part 102 does not directly identify all the relationship parts 106, rather root relationship part 102 relies on the parts 104 to identify their respective relationship parts 106. Alternatively, root relationship part 102 may directly identify all the relationship parts 106 as well as the parts 104.

In FIG. 1, root relationship part 102 is illustrated as identifying parts 104, and each part 104 is illustrated as identifying an associated relationship part 106. These identifications can be made in different manners. In certain embodiments, a particular naming convention is followed that allows such identifications to be made. For example, in certain embodiments the naming convention states that the relationship parts 106 are to follow the format "/_rels/*.rels", where the "*" refers to the associated part 104. So, following this example, if a part has the name "/foo.txt", then the associated relationship part 106 would have the name "/_rels/foo.txt.rels" or "/_rels/foo.rels". By way of another example, in certain embodiments the naming convention states that the parts 104 are to follow the format "/*", where the "*" refers to the part 104, so root relationship part 102 can maintain an entry in the format of "/*" for each part in package 100.

Alternatively, the parts and relationship parts 106 may be identified in different manners other than using such naming conventions. For example, root relationship part 102 may include the name (or other unique identifier) of each part 104, and each part 104 may include the name (or other unique identifier) of each associated relationship part 106.

One type of part 104 is a tracking information part. The tracking information part stores tracking information for the electronic document. A variety of different information can be maintained as the tracking information. Generally, the tracking information can include information about the recipient of the electronic document (e.g., an identifier(s) of the device and/or user to which the electronic document was sent), when the electronic document was sent and/or received (e.g., a date and/or time the electronic document was sent and/or received), routing information for the electronic document (e.g., one or more servers or other computing devices that the electronic document was passed through before being received by the recipient), and so forth. For example, the tracking information could include a list of people that the electronic document was sent to as well as a date and time that the electronic document was sent to each person on the list, a date and time that the electronic document was received and/or opened by each person on the list, routing information describing how the document was communicated to each person on the list, and so forth.

The different applications that access package 100 can store any specific tracking information they desire in the tracking information part. In certain embodiments, the applications and/or users that are permitted to access the tracking information part and retrieve and/or modify the data in the tracking information part varies based on particular DRM techniques being used, as discussed in more detail below.

The tracking information can be maintained in the tracking information part in accordance with any of a variety of different formats. For example, the tracking information may be maintained in an XML format, or alternatively another proprietary or public format.

Tracking information can be added to the tracking information part by the application that creates the electronic document and/or by other applications that access the electronic document. For example, the electronic document may be communicated to another computing device via email, and the email application may include, as tracking information, an indication of the user(s) to which the electronic document was sent and a date and time that the electronic document was sent to each such user(s). As the tracking information is part of the package, the application that created the electronic document, as well as any other application, could subsequently access the tracking information added by the email application.

Tracking information can also be received from the device to which the electronic document was sent (the recipient device). For example, an electronic document may be sent from a source device to the recipient device, and an application running on the recipient device may return an indication to the source device that the electronic document was received, that the electronic document was opened by the user (and optionally the user identifier), that the electronic document was deleted, that the electronic document was forwarded to another device, and so forth. This indication can be received by an application on the source device, and that application can update the tracking information to include whatever indication was received from the recipient device.

By maintaining tracking information in a tracking information part, the application is able to keep a record of the recipients of the electronic document as well as other tracking information, such as when the electronic document was sent. This tracking information is part of the same package as the payload of the electronic document, so it does not get separated, misplaced, forgotten, and so forth. By tying the tracking information to the payload being tracked, the tracking information is readily available to applications to access.

In certain embodiments, package 100 conforms to the Open Packaging Conventions (OPC) specification. Some descriptions of OPC are included herein. Additional information regarding OPC is available as the Ecma Office Open XML File Formats Standard from Ecma International of Geneva, Switzerland (a current draft can be found on the Internet at "www" followed by "ecma-international.org/news/TC45_current_work/TC45-2006-50_final_draft.htm"). Package 200 can also conform to other proprietary or public standards, such as the XML Paper Specification (XPS). Additional information regarding XPS is available from Microsoft Corporation of Redmond, Wash.

Following OPC, each part 104 has properties including a name, a content type, and optionally a growth hint. The name property specifies the name of the part. The part names are represented by a logical hierarchy that consists of segments, with the last segment containing the actual content and the preceding segments serving to organize the parts of the package. For example, the part name "/hello/world/doc.xml" includes three segments: "hello", "world", and "doc.xml". The segments "hello" and "world" serve to organize the parts of the package, and the segment "doc.xml" contains the actual content of the part.

The content type property specifies the type of content stored in the part (e.g., payload, DRM, tracking information, etc.). The content type property defines a media type, a subtype, and an optional set of parameters. Content types conform to the definition and syntax for media types as specified in Request for Comments (RFC) 2616-Hypertext Transfer Protocol-HTTP/1.1 (e.g., section 3.7).

The growth hint property is an optional property that specifies a suggested number of bytes to reserve for the part to grow in-place. The growth hint property identifies the number of bytes by which the creator of the part predicts that the part will grow. This information may be used, for example, to reserve space in a mapping to a particular physical format in order to allow the part to grow in-place.

Following OPC, each relationship part 106 represent a relationship between a source part and a target resource (which may be another part in package 100). Relationship parts store relationships using XML. The XML of a relationship part nests one or more <Relationship> elements in a single <Relationships> element. Each <Relationship> element includes a target attribute, an id attribute, a type attribute, and optionally a target mode attribute.

The target attribute is a URI reference pointing to a target resource. The URI reference may be a URI or a relative reference (a reference to another part in the same package as the relationship part). The id attribute is an XML identifier that uniquely identifies the relationship part within the package that includes the relationship part. The id attribute conforms to the W3C Recommendation "XML Schema Part 2: Datatypes".

The type attribute is a URI that uniquely defines the role of the relationship part. The type attribute allows a meaning to be associated with the relationship part. For example, the type attribute may indicate that the relationship part is a hyperlink, or points to a font, or points to an image, and so forth. The target mode attribute indicates whether the target attribute describes a resource inside the package or outside the package. For example, the value "internal" can be used to indicate that the target attribute describes a resource inside the same package as the relationship part, and the value "external" can be used to indicate that the target attribute describes a resource that is not inside the same package as the relationship part.

The container that stores the package maps the root relationship part 102, the parts 104, and the relationship parts 106 to physical package item names. The container can store the package in any of a variety of different manners, and in the OPC specification the container is a ZIP archive file. The ZIP archive file conforms to the well-known ZIP file format specification, but in certain embodiments excludes the elements of the ZIP file format specification that relate to encryption or decryption.

Each package is typically stored as a single ZIP file, although alternatively a package may be stored as multiple ZIP files, or multiple packages may be included in a single ZIP file. A ZIP file includes ZIP items, which are the root relationship part 102, the parts 104, and the relationship parts 106 of package 100.

Figure 2:
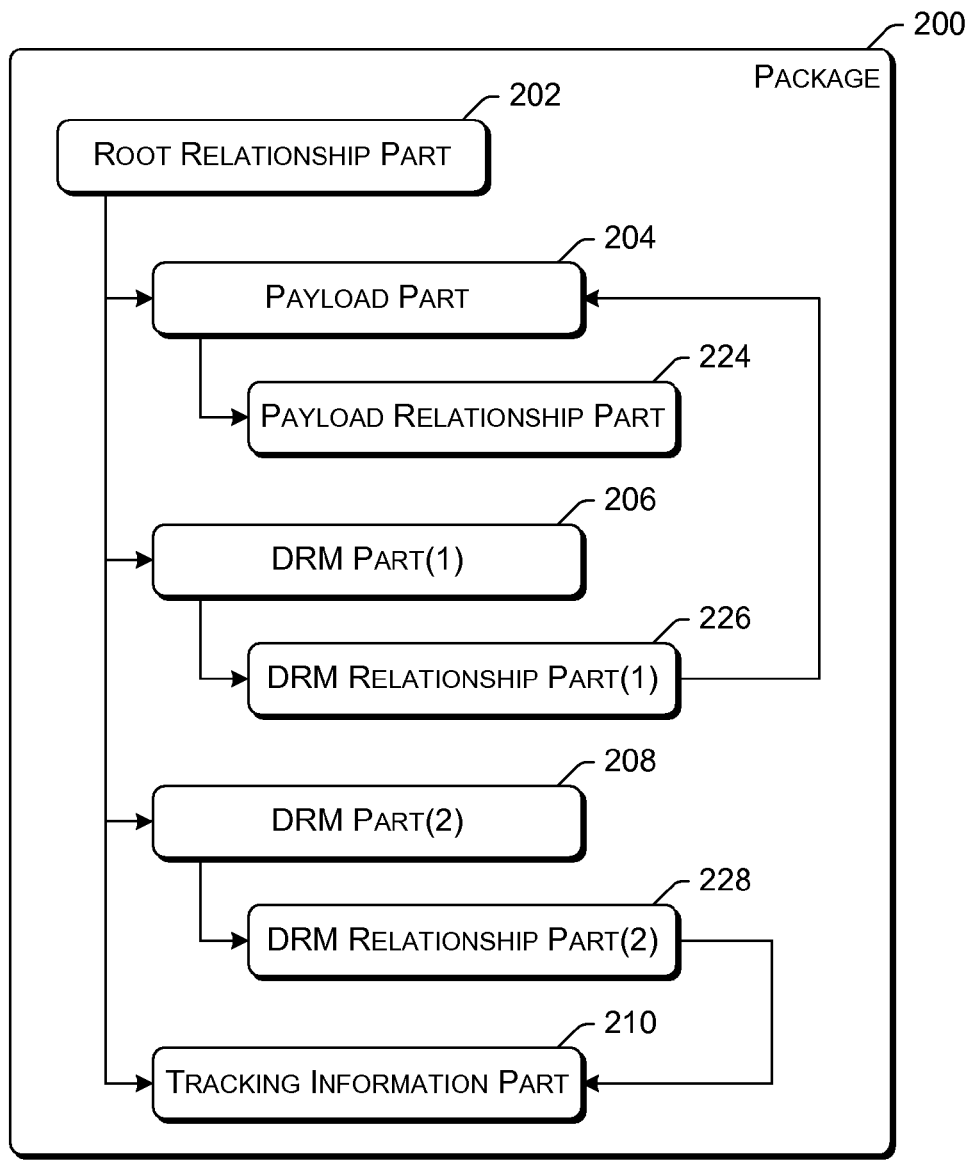
FIG. 2 illustrates an example package for an electronic document.

FIG. 2 illustrates an example package 200 for an electronic document. Package 200 is an example of a package 100 of FIG. 1. Package 200 includes a root relationship part 202, parts 204, 206, 208, and 210, and relationship parts 224, 226, and 228.

Payload part 204 contains most of the data for the electronic document (e.g., a word processing document), and payload relationship part 224 identifies one or more external resources (not shown) that are to be presented as part of the electronic document (e.g., one or more images). DRM part 206 includes the digital rights management for different parts of package 200 as identified by DRM relationship part 226. In the illustrated example, the rights described by DRM part 206 are applied to payload part 204. The information maintained in DRM part 206 can vary based on the type of digital rights management being used and the results desired by the creator of DRM part 206 (and/or by others with access to modify DRM part 206). DRM part 206 can identify, for example, the user identifiers of others that are permitted to access part 204, a digital certificate that is required by a device or application in order to access payload part 204, and so forth.

DRM signature part 208 includes a digital signature for different parts of package 200 as identified by DRM signature relationship part 228. In the illustrated example, the digital signature in part 208 is applied to tracking information part 210. The digital signature in part 208 is generated using the private key of a public/private key pair (e.g., of an application that created the electronic document, or of a computing device on which the electronic document was created, or of the user that created the electronic document, and so forth), and allows an application knowing the public key to verify that tracking information part 210 has not been altered since being digitally signed. Digital signatures and public/private key pairs are well known to those skilled in the art and thus will not be described further except as they pertain to the packages discussed herein.

Tracking information part 210 includes tracking information for package 200. In the illustrated example, tracking information part 210 has no associated relationship part, so the tracking information in part 210 is for the entire package 200. Alternatively, tracking information part 210 may have an associated relationship part(s), identifying the parts of package 200 that the tracking information corresponds to. Such an associated relationship part(s) allows different tracking information to be maintained for different parts of package 200.

The DRM can be used with package 200 in a variety of different manners. For example, the DRM can apply to payload part 204 but not to tracking information part 210. In such a situation, the DRM restricts access to and/or modification of payload part 204 but does not restrict access to and/or modification of tracking information part 210. By way of another example, DRM can apply to tracking information part 210 but not to payload part 204. In such a situation, the DRM restricts access to and/or modification of tracking information part 210 but does not restrict access to and/or modification of payload part 204.

Figure 3:
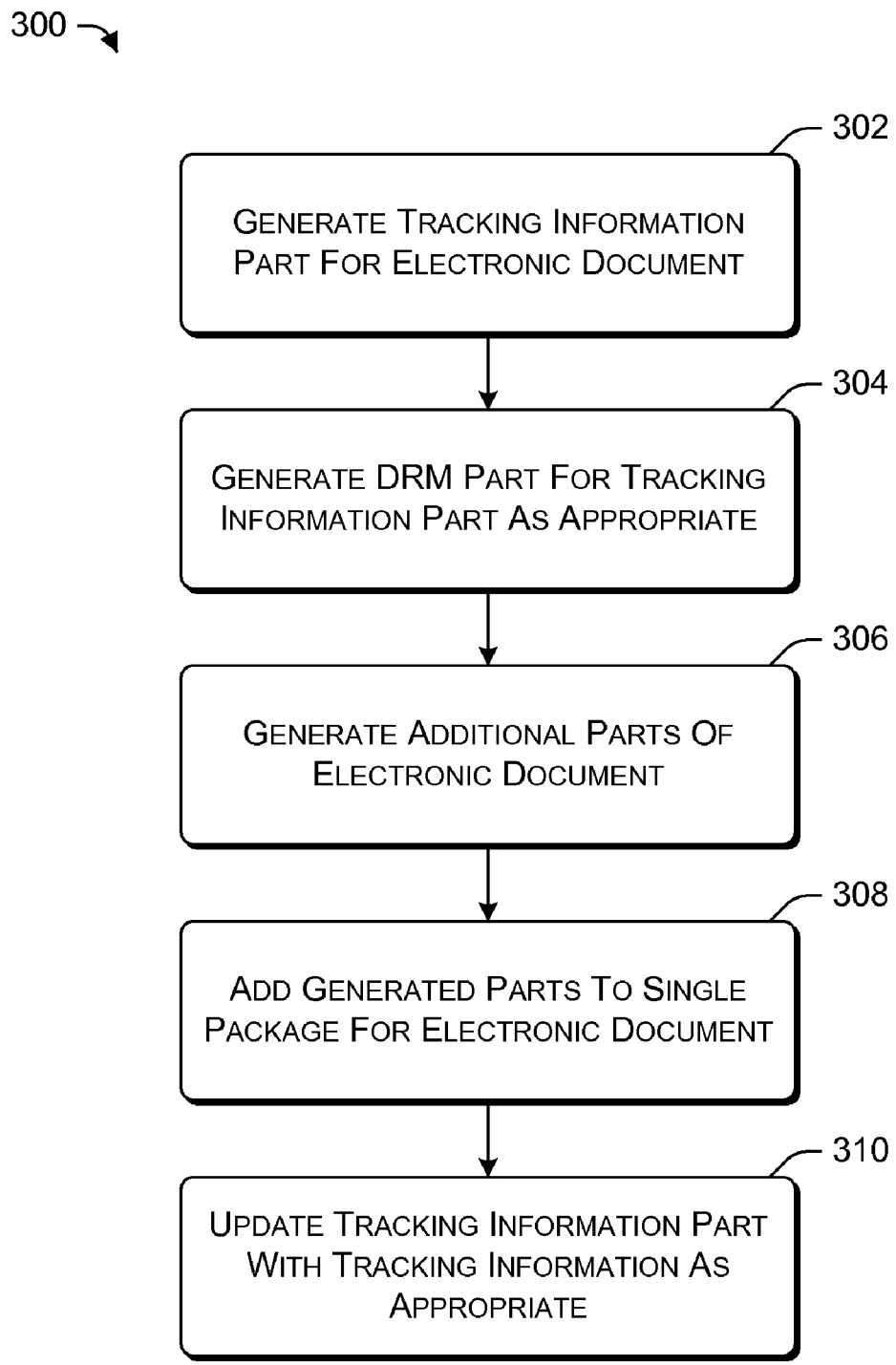
FIG. 3 illustrates an example process for creating a package for an electronic document with tracking information.

FIG. 3 illustrates an example process 300 for creating a package for an electronic document with tracking information. Process 300 can be carried out, for example, by an operating system or application program in creating an electronic document, and may be implemented in software, firmware, hardware, or combinations thereof.

Initially, the tracking information part for the electronic document is generated (act 302). As the actual tracking information is typically not available at the time the electronic document is created, the tracking information part is not yet populated with the tracking information. A digital rights management (DRM) part for the tracking information is also optionally generated (act 304). Whether a DRM part is included for the tracking information, as well as what DRM technique(s) is to be applied to the tracking information, is a decision that can be made by the application performing process 300 and/or by the user of the computing device running the application.

Any additional parts for the electronic document are also generated (act 306), and all generated parts are added to the package for the electronic document (act 308). All of the generated parts are stored in the same container (e.g., a ZIP archive file, as discussed above).

The tracking information part is updated with tracking information as appropriate (act 310). The tracking information part is populated with the tracking information as the electronic document is communicated to one or more recipient(s). The particular tracking information to include in the tracking information part can be identified in any of a variety of manners. In certain embodiments, default tracking information (e.g., recipient and time sent) is maintained by computing devices on which electronic documents are created.

This default tracking information may be the same for all applications, or may be different for different applications, and may be user-configurable. Additionally, the user or application may override any of the default tracking information and specify which specific tracking information is to be included for particular applications and/or particular electronic documents. For example, the application may present a user interface to the user that displays the possible tracking information that may be maintained and allow the user to select which tracking information is to be maintained.

Figure 4:
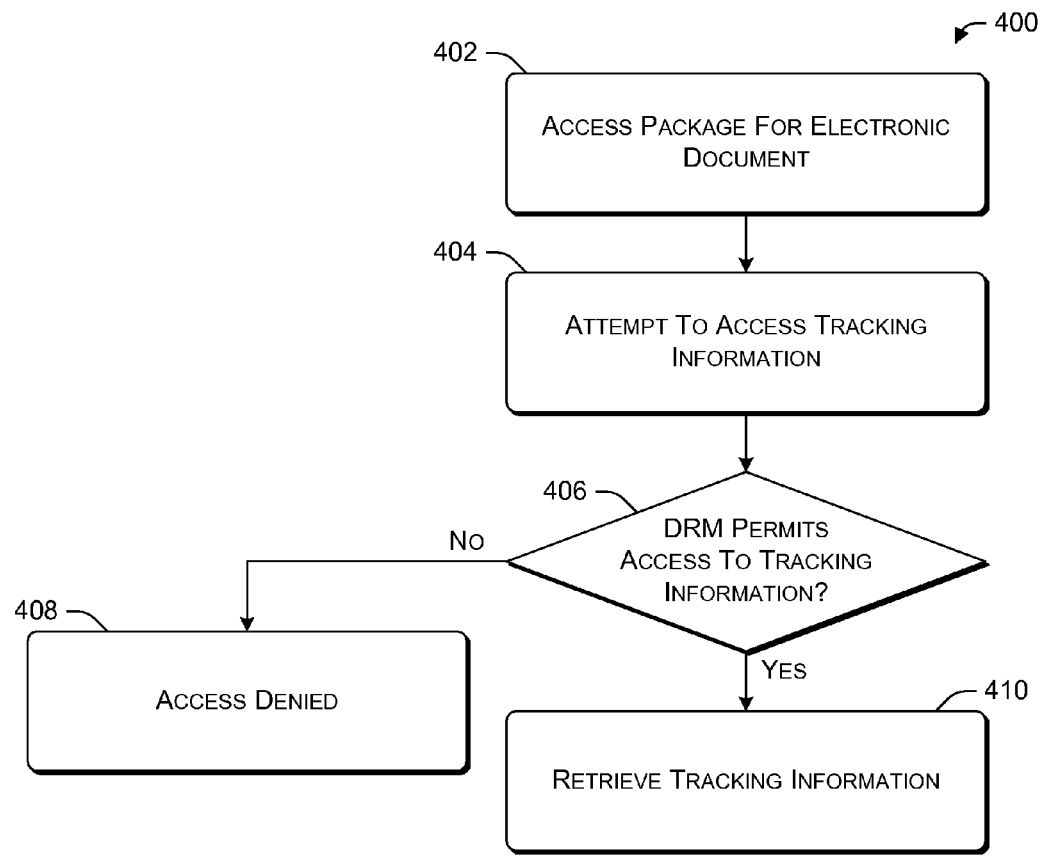
FIG. 4 illustrates an example process for accessing a package for an electronic document with tracking information.

FIG. 4 illustrates an example process 400 for accessing a package for an electronic document with tracking information. Process 400 can be carried out, for example, by an operating system or application program, and may be implemented in software, firmware, hardware, or combinations thereof.

Initially, the package for the electronic document is accessed (act 402) and an attempt to access the tracking information part is made (act 404). A check is made as to whether the DRM techniques for the package, as identified in a DRM part(s) of the package, allow the application to access the tracking information (act 406). As discussed above, this may require the application to have a particular key to decrypt the tracking information, may require the user of the application to have a particular user id, and so forth.

If the DRM does not allow the application to access the tracking information, then access to the tracking information is denied (act 408). However, if the DRM does allow the application to access the tracking information, then the tracking information is retrieved (act 410).

Figure 5:
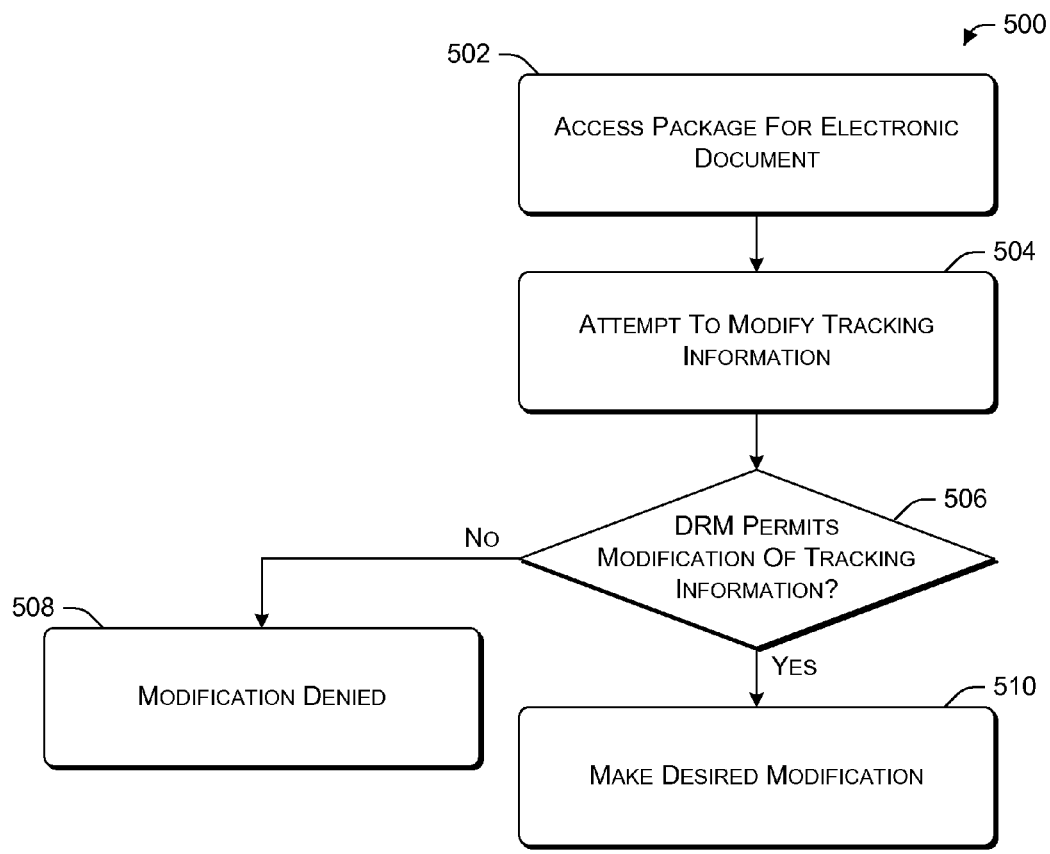
FIG. 5 illustrates an example process for modifying a package for an electronic document with tracking information.

FIG. 5 illustrates an example process 500 for modifying a package for an electronic document with tracking information. Process 500 can be carried out, for example, by an operating system or application program, and may be implemented in software, firmware, hardware, or combinations thereof.

Initially, the package for the electronic document is accessed (act 502) and an attempt to modify the tracking information is made (act 504). A check is made as to whether the DRM techniques for the package, as identified in a DRM part(s) of the package, allow the application to modify the tracking information (act 506). As discussed above, this may require the application to have a particular key to modify the data, may require the user of the application to have a particular user id, and so forth.

If the DRM does not allow the application to modify the tracking information, then the attempted modification is denied (act 508). However, if the DRM does allow the application to modify the tracking information, then the application can modify the tracking information as desired (act 510).

Figure 6:
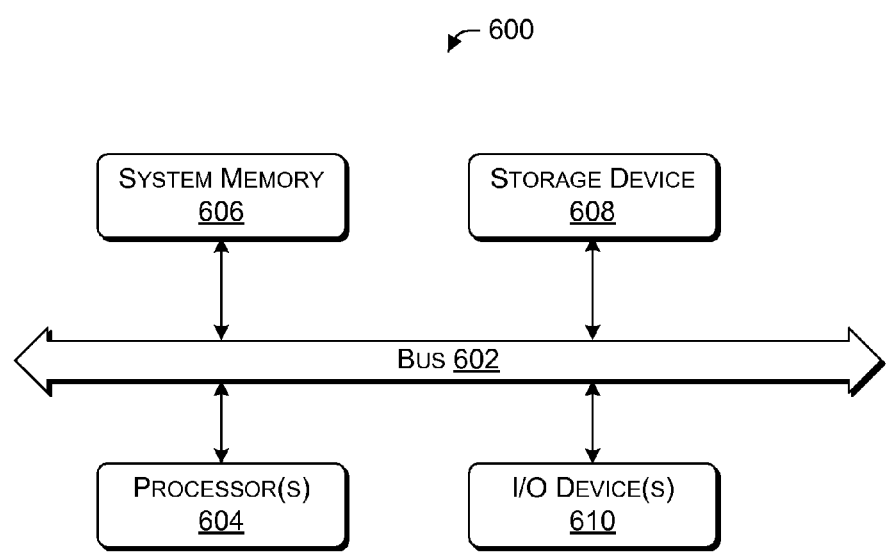
FIG. 6 illustrates an example of a general computing device that can be used to implement the techniques discussed herein.

FIG. 6 illustrates an example of a general computing device 600 that can be used to implement the maintaining of tracking information for electronic documents discussed herein. Computing device 600 can be a device the uses package 100 of FIG. 1 or package 200 of FIG. 2, and that implements process 300 of FIG. 3, process 400 of FIG. 4, and/or process 500 of FIG. 5. Computing device 600 is only one example of a computing device and is not intended to suggest any limitation as to the scope of use or functionality of the computing device and network architectures. Neither should computing device 600 be interpreted as having any requirement regarding the inclusion (or exclusion) of any components or the coupling or combination of components illustrated in the example computing device 600.

Computing device 600 is a general-purpose computing device that can include, but is not limited to, one or more processors or processing units 604, a system memory 606, and a bus 602 that couples various system components including the processor 604 to the system memory 606.

Bus 602 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 606 includes computer readable media in the form of volatile memory, such as random access memory (RAM), and/or non-volatile memory, such as read only memory (ROM) 612.

Computing device 600 may also include other removable/non-removable, volatile/non-volatile computer storage device 608. By way of example, storage device 608 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 600.

User commands and other information can be entered into computing device 600 via one or more input/output (I/O) devices 610, such as a keyboard, a pointing device (e.g., a "mouse"), a microphone, a joystick, a game pad, a satellite dish, a serial port, a universal serial bus (USB), an IEEE 1394 bus, a scanner, a network interface or adapter, a modem, and so forth. Information and data can also be output by computing device 600 via one or more I/O devices 610, such as a monitor, a printer, a network interface or adapter, a modem, a speaker, and so forth.

An implementation of the maintaining tracking information for electronic documents described herein may be described in the general context of processor-executable instructions or computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the maintaining tracking information for electronic documents may be stored on or transmitted across some form of computer readable media. Computer readable media or processor-readable media can be any available media that can be accessed by a computer. By way of example, and not limitation, computer readable media or processor readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer storage media having a plurality of instructions that, when executed by one or more processors, causes the one or more processors to:
    generate an electronic document comprising:
        a root relationship part that identifies each of a payload part, a tracking information part and a plurality of digital rights management (DRM) parts;
        the payload part that stores data for the electronic document;
        the tracking information part that stores tracking information for the electronic document, wherein the tracking information is configured to store routing information relating to one or more computing devices the electronic document passes through when the electronic document is sent to each recipient in a list of recipients;
        a first DRM part identifying the payload part via a first DRM relationship part, and storing information protecting access to the payload part; and
        a second DRM part identifying the tracking information part via a second DRM relationship part, and storing information protecting access to the tracking information part, wherein the first DRM part and the second DRM part assign different DRM rights to the payload part and the tracking information part; and
    store each of the payload part, the tracking information part, the first DRM part, and the second DRM part of the electronic document in a single package for communication.

2. One or more computer storage media as recited in claim 1, wherein the tracking information identifies, for each recipient in the list of recipients, when the single package is sent to each of the recipients and when the single packaged is accessed by each recipient.

3. One or more computer storage media as recited in claim 1, wherein the first DRM part and the second DRM part store information restricting access to the payload part but not restricting access to the tracking information part.

4. One or more computer readable storage as recited in claim 1, wherein the first DRM part and the second DRM part store information restricting access to the tracking information part but not restricting access to the payload part.

5. One or more computer readable storage as recited in claim 1, wherein the single package is stored as a ZIP file.

6. One or more computer storage media as recited in claim 1, wherein the electronic document further comprises one or more relationship parts associated with the payload part, wherein the one or more relationship parts:
    identify a resource external to the single package or another part in the single package; and
    are directly identified by the payload part instead of the root relationship part.

7. One or more computer storage media having a plurality of instructions that, when executed by one or more processors, cause the one or more processors to:
    access a package storing a plurality of parts of an electronic document, the plurality of parts including:
        a root relationship part that identifies one or more of the plurality of parts;
        a payload part that stores data for the electronic document;
        a tracking information part that stores tracking information for the package, wherein the tracking information identifies one or more recipients of the package, when the package was sent to each of the one or more recipients, and routing information relating to one or more computing devices the package passes through when the package is sent to each of the one or more recipients; and
        a digital rights management part that stores information protecting access to the payload part and the tracking information part, wherein different digital rights management protection is assigned to the payload part and the tracking information part;
    attempt to access the tracking information part;
    check whether the digital rights management part indicates that the tracking information part can be accessed; and
    retrieve the tracking information if the digital rights management part indicates that the tracking information part can be accessed.

8. One or more computer storage media as recited in claim 7, wherein the plurality of instructions further cause the one or more processors to:
    attempt to modify the tracking information;
    check whether the digital rights management part indicates that the tracking information can be modified; and
    make a modification to the tracking information if the digital rights management part indicates that the tracking information can be modified.

9. One or more computer storage media as recited in claim 7, wherein the package is stored as a single ZIP archive file.

10. One or more computer storage media as recited in claim 7, wherein the tracking information identifies, for each of the one or more recipients, when the package was accessed by the recipient.

11. One or more computer storage media as recited in claim 7, wherein the digital rights management part indicates that the tracking information cannot be accessed even though the payload part can be accessed.

12. One or more computer storage media as recited in claim 7, wherein the plurality of parts further include one or more relationship parts associated with the payload part, wherein the one or more relationship parts:

identify a resource external to the package or another part in the package; and are directly identified by the payload part instead of the root relationship part.

13. A method comprising:

accessing, by one or more processors configured with executable instructions, a package storing a plurality of parts of an electronic document, the plurality of parts comprising:

a root relationship part that identifies one or more of the plurality of parts;

a payload part, identified by the root relationship part, that stores data for the electronic document;

a tracking information part, identified by the root relationship part, that stores tracking information for the electronic document, wherein the tracking information identifies one or more recipients of the package, when the package was sent to each of the one or more recipients, and routing information relating to one or more computing devices the package passes through when the package is sent to each of the one or more recipients;

one or more digital rights management parts that store information protecting access to the payload part and the tracking information part, wherein different digital rights management protection is assigned to the payload part and the tracking information part;

attempting to modify the tracking information in the tracking information part;

checking whether the digital rights management part indicates that the tracking information can be modified; and making a modification to the tracking information only if the digital rights management part indicates that the tracking information can be modified.

14. A method as recited in claim 13, wherein the package is stored as a single ZIP archive file.

15. A method as recited in claim 13, further comprising:

creating the package storing the plurality of parts of the electronic document, wherein creating the package comprises:

specifying a content type property for each of the parts; and specifying a growth hint property for each of the parts, wherein the growth hint property identifies the number of bytes to reserve for each part to grow.

\* \* \* \* \*